(12) United States Patent  
Shoaff

(10) Patent No.: US 8,568,253 B2  
(45) Date of Patent: Oct. 29, 2013

(54) GOLF SWING TRAINING DEVICE AND METHOD

(71) Applicant: Thomas M. Shoaff, Fort Wayne, IN (US)

(72) Inventor: Thomas M. Shoaff, Fort Wayne, IN (US)

(*) Notice: Subject to any disclaimer, the term of this patent is extended or adjusted under 35 U.S.C. 154(b) by 0 days.

(21) Appl. No.: 13/718,072

(22) Filed: Dec. 18, 2012

(65) Prior Publication Data

US 2013/0165274 A1    Jun. 27, 2013

Related U.S. Application Data

(60) Provisional application No. 61/579,267, filed on Dec. 22, 2011.

(51) Int. Cl.
*A63B 69/36* (2006.01)
*A63B 21/02* (2006.01)

(52) U.S. Cl.
USPC .......................... 473/409; 473/276; 482/124

(58) Field of Classification Search
USPC ......... 473/207, 212, 215, 266, 269, 276, 409; 482/69, 121–130; 434/247, 248, 252
See application file for complete search history.

(56) References Cited

U.S. PATENT DOCUMENTS

| | | | |
|---|---|---|---|
| 4,134,589 A | | 1/1979 | Arena |
| 5,024,443 A | * | 6/1991 | Bellagamba ............... 473/212 |
| 5,048,836 A | | 9/1991 | Bellagamba |
| 5,358,250 A | | 10/1994 | Spencer |
| 5,451,060 A | * | 9/1995 | Dalbo .......................... 473/215 |
| 5,690,494 A | | 11/1997 | Luker |
| 5,803,822 A | * | 9/1998 | Pursell ........................ 473/216 |
| 6,612,845 B1 | * | 9/2003 | Macri et al. ................. 434/247 |
| 7,314,437 B2 | * | 1/2008 | Frappier ...................... 482/124 |
| 7,625,320 B2 | | 12/2009 | Wehrell |
| 7,651,450 B2 | * | 1/2010 | Wehrell ........................ 482/124 |
| 2007/0265114 A1 | | 11/2007 | Carbaugh et al. |
| 2011/0021329 A1 | | 1/2011 | Dunne |

* cited by examiner

*Primary Examiner* — Nini Legesse
(74) *Attorney, Agent, or Firm* — Faegre Baker Daniels LLP

(57) ABSTRACT

A golf swing training device and method. First and second tension members, such as tension cords, have first ends respectively attached to opposite sides of the upper body of a golfer and opposite ends attached to anchor points. The first tension member extends in a substantially rearward direction and the second tension member extends in a substantially forward direction from a shoulder line of the golfer when the golfer is in a ball address position. The tension members provide equal resistance to rotation of the shoulders and torso of the golfer throughout the backswing, and also provide an equal release of the resistance through the downward swing, thereby encouraging consistent and fluid golf swing mechanics.

20 Claims, 5 Drawing Sheets

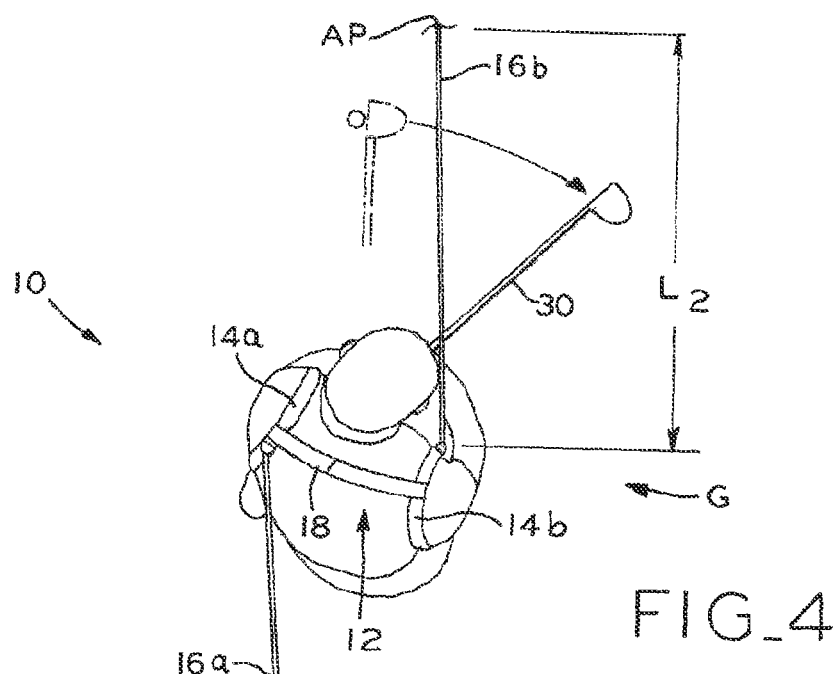
FIG_4
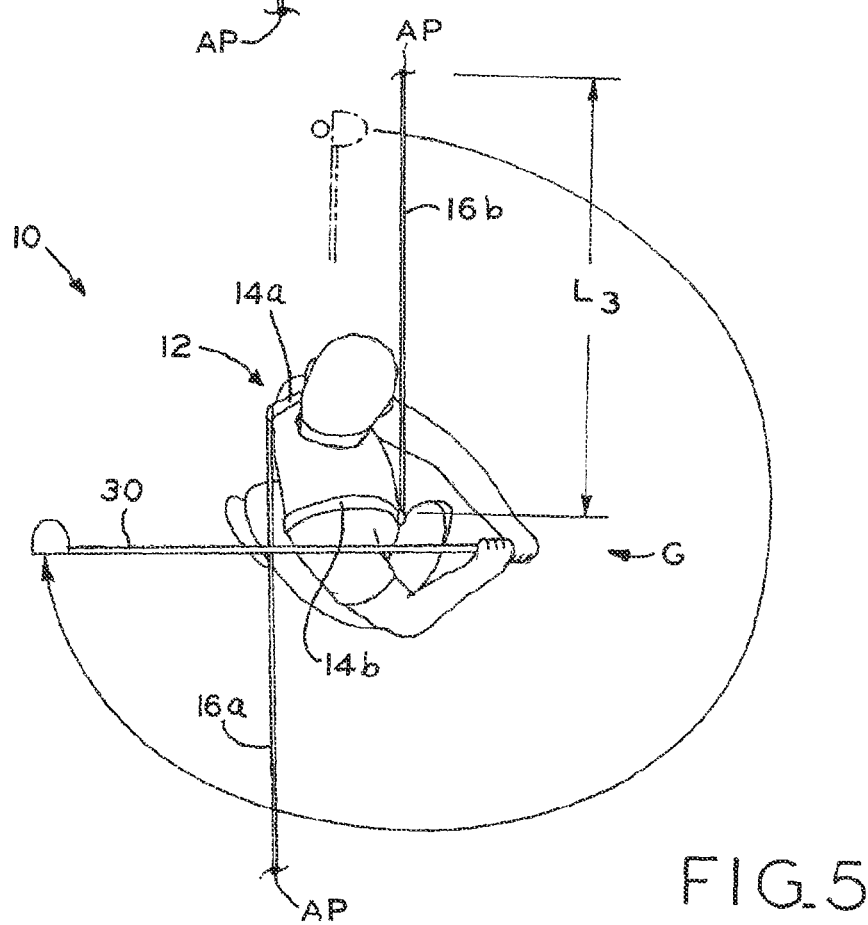
FIG_5

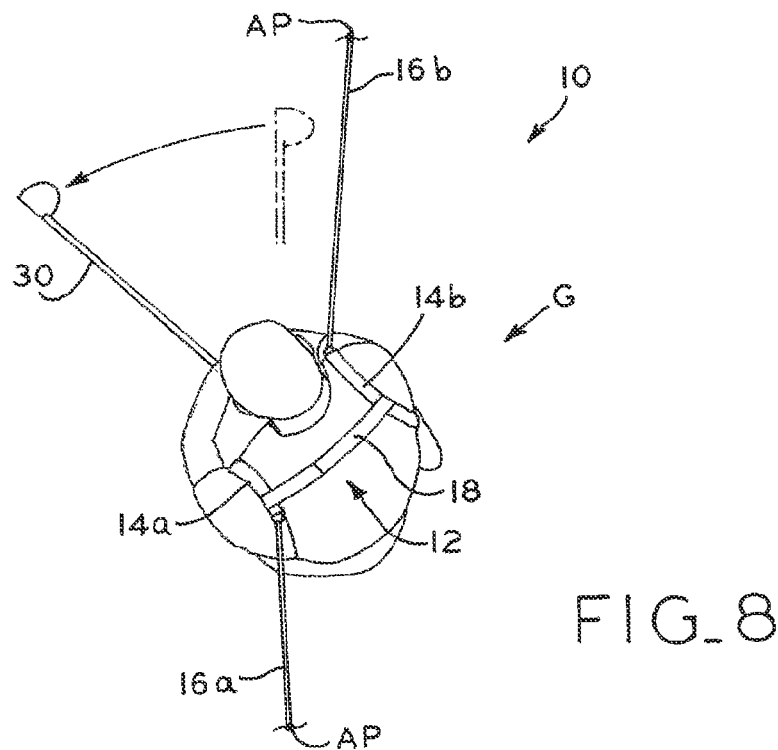
FIG_8
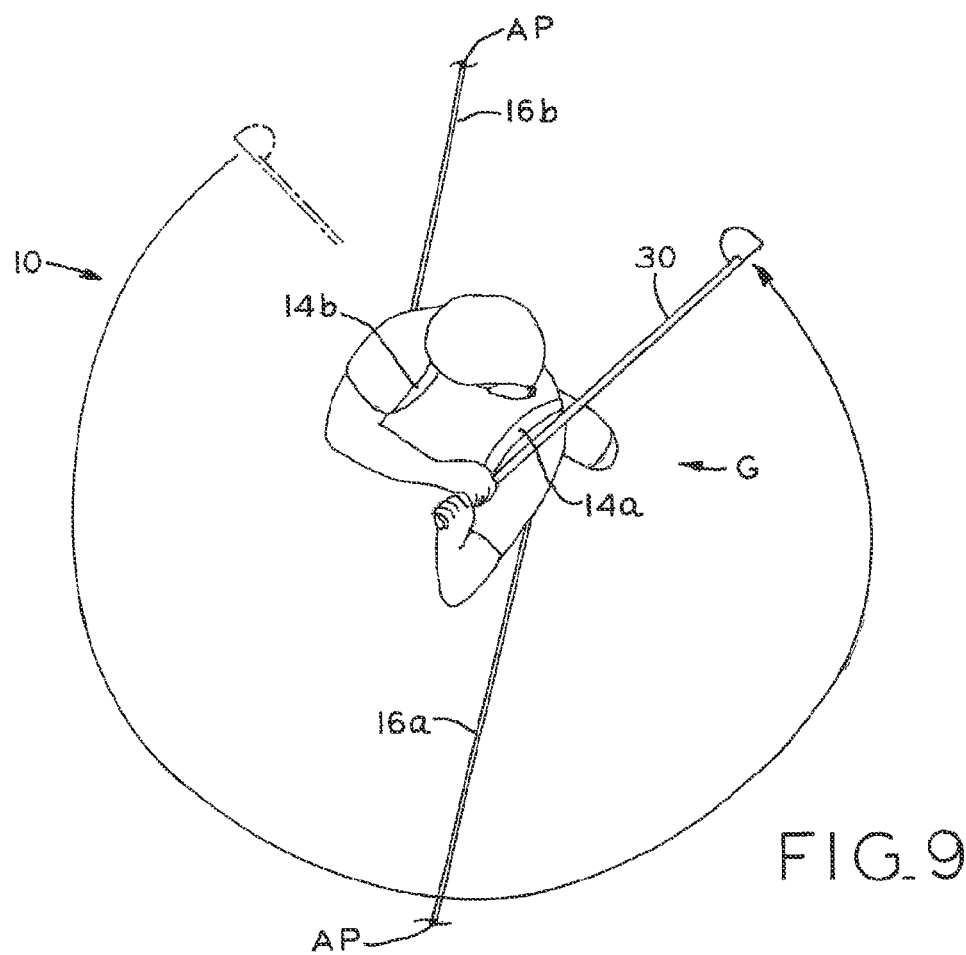
FIG_9

GOLF SWING TRAINING DEVICE AND METHOD

CROSS-REFERENCE TO RELATED APPLICATIONS

This application claims the benefit under Title 35, U.S.C. §119(e) of U.S. Provisional Patent Application Ser. No. 61/579,267, entitled GOLF SWING TRAINING DEVICE AND METHOD, filed on Dec. 22, 2011, the entire disclosure of which is expressly incorporated by reference herein.

BACKGROUND OF THE INVENTION

1. Field of the Disclosure

The present disclosure provides a golf swing training device and method for learning, developing and/or perfecting a consistent, balanced, and fluid golf swing.

2. Description of the Related Art

Many devices and methods are known for aiding a golfer in learning, developing and/or perfecting the golf swing.

However, many of these devices are used to teach or develop only particular, isolated aspects of the golf swing. For example, some devices assist in developing a proper club take-away movement from the ball address position. Other devices assist in establishing and maintaining a proper grip of the golf club. Still other devices assist with arm and club positioning on ball impact and follow-through. While these devices may be helpful in teaching certain aspects of the golf swing, such devices do not assist in the development of the full mechanics of a complete golf swing.

Other known devices, which do potentially assist in the development of a complete golf swing tend to be expensive, large, difficult to assemble, and cumbersome to transport and use. For example, some known golf swing training devices include large frame structures which are difficult to assemble and transport.

What is needed is a golf swing training device and method which is an improvement over the foregoing.

SUMMARY

The present invention provides a golf swing training device and method. First and second tension members, such as tension cords, have first ends respectively attached to opposite sides of the upper body of a golfer and opposite ends attached to anchor points. The first tension member extends in a substantially rearward direction and the second tension member extends in a substantially forward direction from a shoulder line of the golfer when the golfer is in a ball address position. The tension members provide equal resistance to rotation of the shoulders and torso of the golfer throughout the backswing, and also provide an equal release of the resistance through the downward swing, thereby encouraging consistent and fluid golf swing mechanics.

In one form thereof, the present disclosure provides a golf swing training method for use by a golfer, said method including the steps of: standing in a ball address position with an end of a first tension member attached to a side of the upper body of the golfer and an opposite end of the first tension member attached to a first anchor point, the first tension member extending in a rearward direction from the golfer, and with an end of a second tension member attached another side of the upper body of the golfer and an opposite end of the second tension member attached to a second anchor point; initiating a backswing to increase a tension of the first and second tension members; transitioning the backswing to a downswing; and completing the swing with concurrent release of tension from the first and second tension members.

In another form thereof, the present disclosure provides a method for instructing a golfer to perform a golf swing, said method including the steps of: positioning a golfer in a ball address position with an end of a first tension member attached to a first side of the upper body of the golfer and an opposite end of the first tension member attached to a first anchor point, the first tension member extending in a rearward direction from the golfer, and with an end of a second tension member attached to another side of the upper body of the golfer and an opposite end of the second tension member attached to a second anchor point; instructing the golfer to execute a golf swing including the following steps: initiating a backswing to increase a tension the first and second tension members; transitioning the backswing to a downswing; and completing the swing with concurrent release of tension from the first and second tension members.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein:

FIG. 4 is a top view progressing from FIG. 2, showing progression of the backswing with club movement to the club take-away position;

FIG. 5 is a top view progressing from FIG. 4, showing progression of the backswing with club movement to the top of the backswing;

FIG. 8 is a top view progressing from FIG. 7, showing the progression of the follow-through portion of the swing following the ball impact position; and FIG. 9 is a top view progressing from FIG. 8, showing completion of the follow-through portion of the swing.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
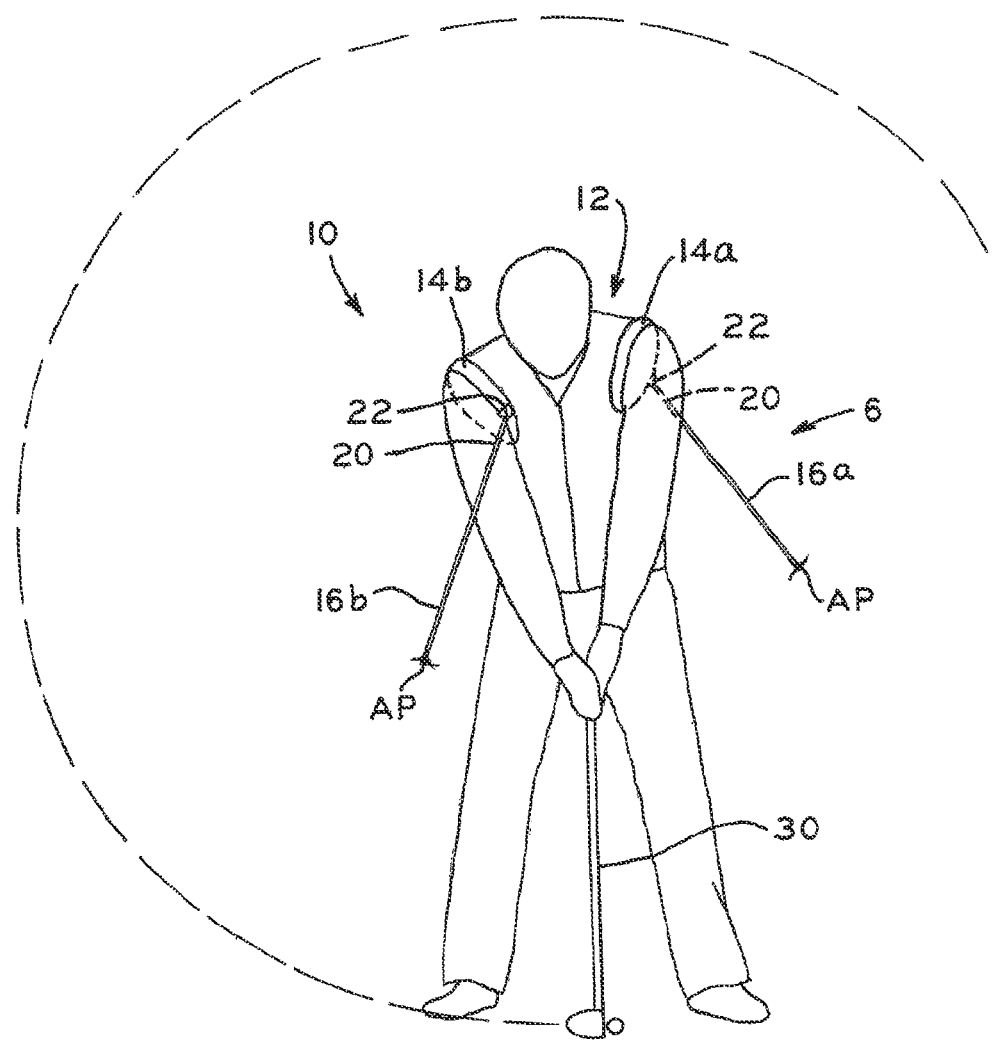
FIG. 1 is a front view of a golfer using the present golf swing training device and method, the golfer standing in a ball address position with the swing path of the head of the golf club shown in a dashed line.
Figure 2:
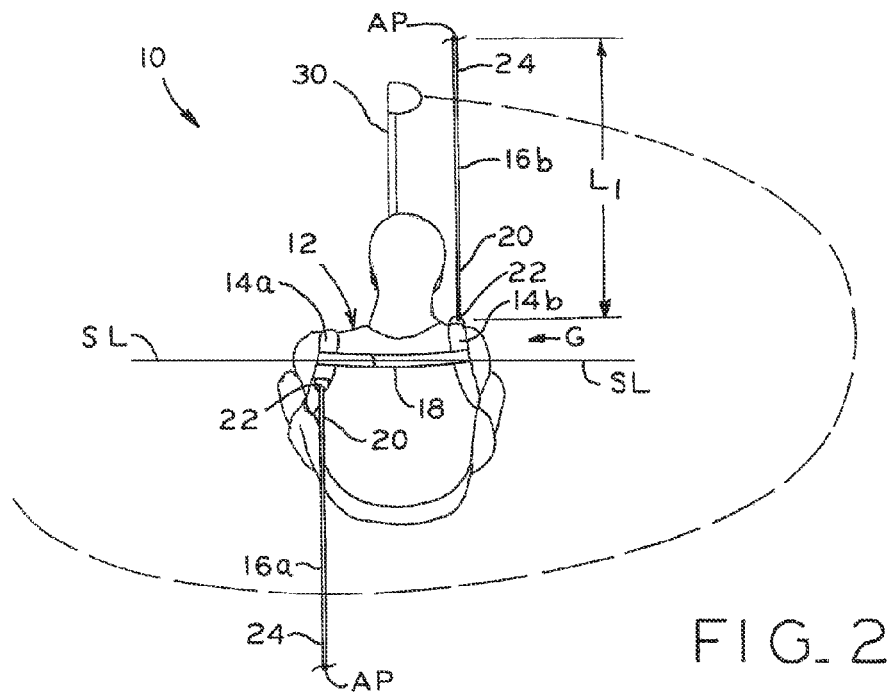
FIG. 2 is a top view thereof.
Figure 3:
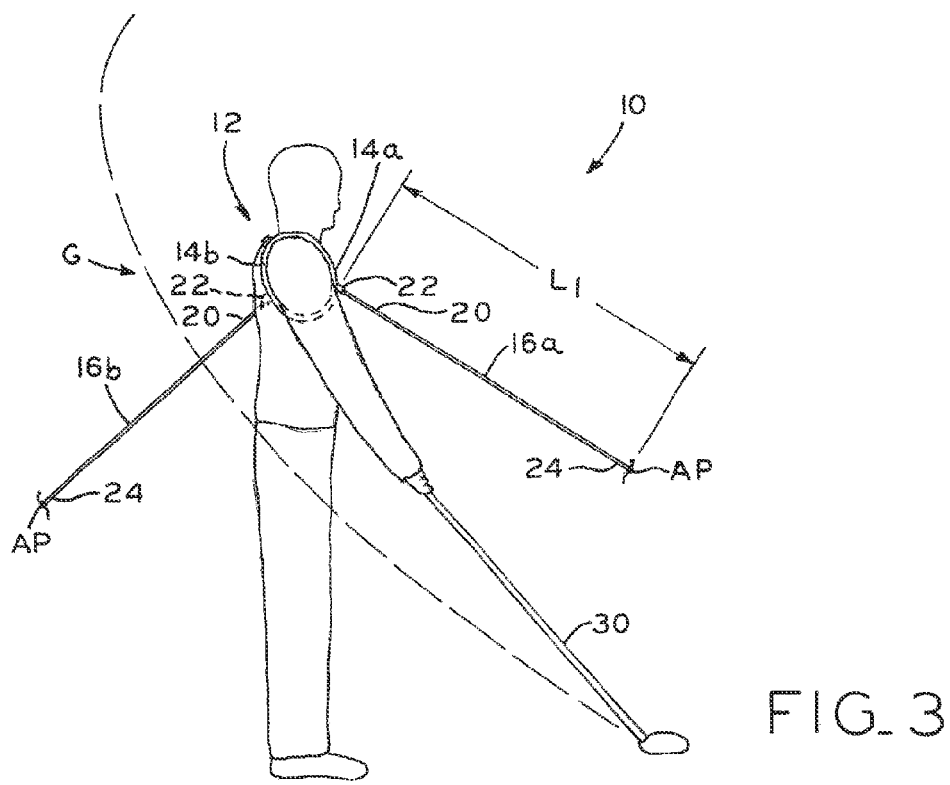
FIG. 3 is a right side view thereof.

Referring first to FIGS. 1-3, a golf swing training device 10 and method in accordance with the present disclosure is shown in connection with a golfer G using a right-handed golf swing. However, it should be understood that the device and method of the present disclosure is equally applicable to use of a left-handed golf swing and, as will be apparent based on the description below, the present training device 10 and method is readily configurable for use with a left-handed golf swing. Also, references to locations and positions herein, such as "right" and "left", etc., are discussed with respect to the viewpoint of the golfer G, except as specifically referenced otherwise below.

In one embodiment, the present method may be performed entirely by golfer G acting alone or, in another embodiment, a golf instructor or a manufacturer or seller of the present device 10, for example, may aid in instructing a golfer G as to the use of the device 10, such as the positioning of the golfer G and execution of a golf swing using the device 10.

The device 10 generally includes a harness assembly 12 with a pair of shoulder straps 14a and 14b, and a pair of tension members 16a and 16b. A first shoulder strap 14a is fitted around and encircles the left shoulder and left arm of the golfer G and a second shoulder strap 14b is fitted around and encircles the right shoulder and right arm of the golfer G. Straps 14a and 14b may be formed of any suitable flexible material such as belting, leather, etc., and may include any desired padding or cushioning material. Shoulder straps 14a and 14b may optionally be connected to one another across the shoulder and behind the head of the golfer G by a connecting strap 18. Shoulder straps 14a and 14b and connecting strap 18 may include buckles, hook and loop fasteners, or other fastening and/or adjusting arrangements to secure same in place and/or to facilitate adjustability for golfers of varying size. Other means of attaching ends of the tension members (discussed below) to the golfer G either to, or proximate to, the shoulders and/or upper arms of the golfer G may also be used.

Harness assembly 12 is described herein as being attached to, or otherwise associated with, the shoulders of golfer G and, in one embodiment, the tension members (discussed below) are attached to, or attached proximate to, the shoulders of golfer G and are operably associated with movement of the shoulders of golfer G during the golf swing. However, the present method may be more generally understood in the context of the tension members being attached to, or otherwise associated with, opposite sides of the upper body of golfer G during the golf swing. Thus, the tension members may be attached to, or operably associated with, the upper arms of golfer G, for example.

Tension members 16a and 16b may be tension cords made of a resilient, elastic material which may be placed under tension by elongation to provide resistance. Examples include thick, rubber band devices or bungee cord devices. Referring to FIGS. 1-3, each tension member 16a and 16b includes a first end 20 attached to a respective shoulder strap at an attachment point 22 and a second, opposite end 24 attached to a fixed anchor point (not shown), represented as AP in the figures. The fixed anchor points are stationary members such as posts, walls, trees, or other substantially fixed and immovable objects.

As best shown in FIG. 2, when the golfer G is standing in a ball address position, the shoulders of the golfer are disposed along a shoulder line SL of the golfer G. Tension member 16a associated with the left shoulder of the golfer G extends in a rearward direction with respect to the golfer G, which rearward direction may be substantially perpendicular to the shoulder line SL when the golfer G is in the ball address position. Tension member 16b associated with the right shoulder of the golfer G extends in a forward direction with respect to the golfer G, which forward direction may substantially perpendicular to the shoulder line SL when the golfer G is in the ball address position. Alternatively, tension members 16a and 16b may extend in respective rearward and forward directions from the golfer G in a manner such that tension members 16a and 16b are not perpendicular to shoulder line SL but are rather angled to some extent from being perpendicular to shoulder line SL. In this manner, as described in further detail below, the tension members 16a and 16b associated with the left and right shoulders of the golfer G extend in substantially opposite directions and, upon rotation of the shoulders with initiation of the backswing, the tension members 16a and 16b will be elongated and thereby tensioned to provide resistance.

Additionally, as best shown in FIG. 3, the tension members 16a and 16b may extend at a generally downward angle from the shoulders of the golfer G toward the anchor points which may be disposed at, or just above, the ground surface. In other embodiments, the tension members 16a and 16b may extend substantially parallel to the ground surface, depending upon the placement of the anchor points. As will be apparent from the discussion below and as shown in FIGS. 1-9, due to the positioning of the tension members 16a and 16b as shown and described herein, the tension members 16a and 16b are positioned generally outside of the swing plane of the golf club and therefore do not interfere with the golf swing. If necessary, the angles of the tension members 16a and 16b and/or position of the anchor points may be adjusted to accommodate the varying heights and/or swing paths of different golfers.

Use of the device 10 will now be described. First, the golfer G fits the harness assembly 12 in place with the shoulder straps 14a and 14b fitted around the shoulders of the golfer G adjusted as necessary, and the tension members 16a and 16b oriented as described above and shown in FIGS. 1-3. The golfer G selects a desired golf club 30 and initially stands in the ball address position shown in FIGS. 1-3. Although use of the golf club 30 is not required to practice the golf swing using the present device and method, use of a golf club will typically be desired. Similarly, the use of golf balls is also optional, though not necessary.

In the ball address position, as best shown in FIG. 2, in one embodiment the tension members 16a and 16b are not elongated from their nominal length and thereby are under no tension. In particular, the tension members 16a and 16b may be pulled substantially taut such that there is little, if any, droop or slack in the tension members 16a and 16b, and yet the tension members 16a and 16b are not stretched to place the tension members 16a and 16b in tension. The respective change in the length of the tension members 16a and 16b though the golf swing will be referenced with respect to tension member 16b below, it being understood that the length of tension member 16a varies in the same or similar manner.

In other embodiments, the tension members 16a and 16b may be slightly stretched to place the tension members 16a and 16b in a more tensioned state. In the ball address position, when this tension is equal between the tension members 16a and 16b, the tension members 16a and 16b advantageously aid in correctly positioning the shoulders of the golfer G in the ball address position. Referring to FIGS. 2 and 3, tension member 16b is represented as having a length of $L_1$ in the ball address position, with length $L_1$ defined between the opposite ends of tension member 16b, such as between attachment point 22 and anchor point AP.

In either case, as best shown in FIGS. 2, 4, and 5, the tension members 16a and 16b resist the clockwise rotation of the shoulders of the golfer G upon initiation of the backswing. More particularly, referring to the top view of FIG. 4, when the golfer G initiates the backswing, rotation of the shoulders of the golfer G in a clockwise direction begins to stretch or elongate the tension members 16a and 16b, with the length of tension member 16b increasing to $L_2$ (and the length of tension member 16a increasing similarly), which in turn provide resistance to rotation of the shoulders. With an even, synchronized rotation of the shoulders, the tension applied to the tension members 16a and 16b, and therefore the resistance experienced by the golfer G, will be equal. In this manner, the tension members 16a and 16b provide an active feedback to the golfer G in the form of resistance which the golfer G is able to sense, which encourages the even, fluid rotation of the shoulders and torso of the golfer G throughout the backswing.

Further rotation of the shoulders of the golfer G through the backswing as shown between FIGS. 4 and 5 increases the elongation, and therefore the tension, of the tension members 16a and 16b, with the length of tension member 16b increasing to $L_3$ (and the length of tension member 16a increasing similarly), thereby providing a continuously increasing resistance to the backswing until the golfer G reaches the top of the backswing as shown in FIG. 5, where the tension members 16a and 16b are at a maximum length and thereby under a maximum amount of tension. In this manner, the resistance experienced by the golfer G continuously increases through the progression of the backswing, with the greatest tension experienced at the top of the backswing when the golf club 30 is substantially parallel with the ground surface. Advantageously, the configuration of the tension members 16a and 16b can be selectively tailored such that the peak resistance experienced by the golfer G at the top of the backswing discourages "overswing" by which the golf club 30 breaks a conceptual line parallel with the ground surface.

However, in use of the present method it is not required that the golfer G perform the golf swing up to a point where the golf club 30 is substantially parallel with the ground surface as shown in FIG. 5. For example, from the ball address position of FIGS. 1-3 the golfer G may execute the backswing only to a take-away position such as that shown in FIG. 4 before initiating the downward swing, in order to improve proper club take-away mechanics. In addition, the golfer G may execute the backswing to any position, such as any position between those shown in FIGS. 4 and 5, or even to a position beyond FIG. 5, before initiating the downward swing. Thus, as used herein, the phrase "the top of the backswing" should generally be understood as encompassing not only the position shown in FIG. 5 with the golf club 30 substantially parallel with the ground surface, but also any other position at which the backswing is transitioned to the downswing.

Figure 6:
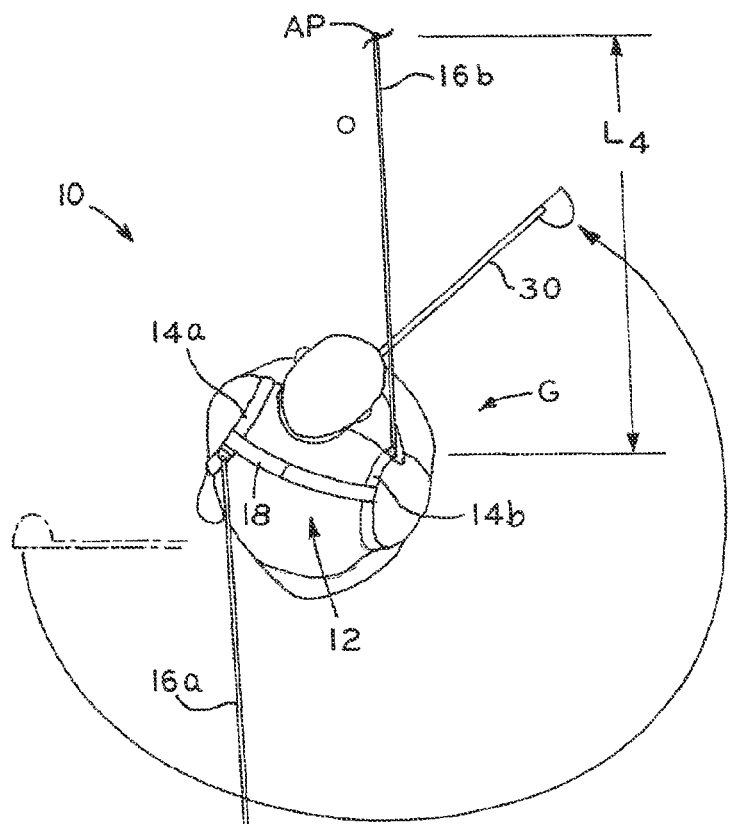
FIG. 6 is a top view progressing from FIG. 5, showing progression of the downward swing with club movement approaching the ball impact position.

Thereafter, as shown between FIGS. 5 and 6, the golfer G begins the downward swing of the golf club 30, and reverse rotation of the shoulders of the golfer G in a counterclockwise direction allows the tension members 16a and 16b to elastically shorten with concurrent release of tension from the tension members 16a and 16b, with the length of tension member 16b decreasing to $L_4$ (and the length of tension member 16a decreasing similarly). Typically, the tension release will be equal across the tension members 16a and 16b to encourage a fluid, even shoulder and torso rotation. The progressive release of tension from the tension members 16a and 16b during the downward swing also aids in the transfer and placement of the weight of the golfer G to the left foot through the downward swing approaching the ball impact position.

Figure 7:
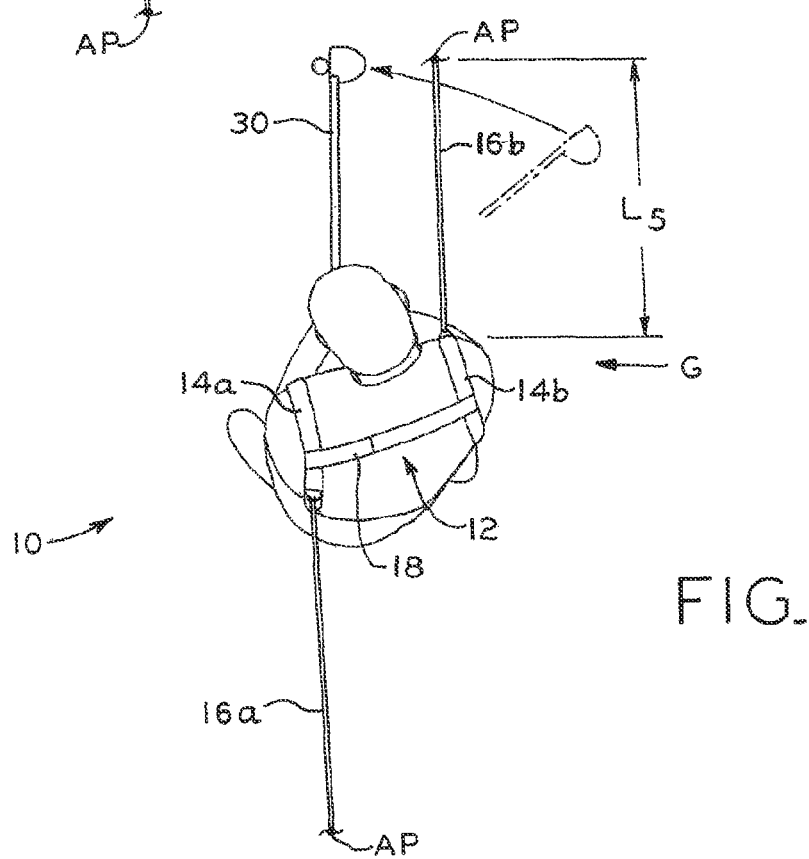
FIG. 7 is a top view progressing from FIG. 6, showing progression of the downward swing with the club head at the ball impact position.

Referring to FIG. 7, as the golfer G completes the swing through the ball impact position at which the head of the golf club 30 strikes the ball, the tension members 16a and 16b return to their nominal positions corresponding to the ball address position described above. The ball impact position therefore corresponds to a complete release of the resistance provided by the tension members 16a and 16b, and the release of tension from the tension members 16a and 16b also reinforces the acceleration of the head of golf club 30 through the downswing and ball impact position and into the follow-through, as well as encouraging the proper "roll-over" of the wrists and forearms through the ball impact position. Just following the ball impact position shown in FIG. 7, the length of tension member 16b decreases to $L_5$ which is shorter than $L_1$ (and the length of tension member 16a increasing similarly).

During the follow-through portion of the swing shown in FIGS. 8 and 9, the shoulders of the golfer G continue to rotate in a counterclockwise direction with the tension members 16a and 16b remaining in their non-tensioned, released or slackened position. In this manner, tension members 16a and 16b do not provide resistance to, or inhibit, the follow-through portion of the golf swing by which the golfer G reaches the final follow-through position shown in FIG. 9. Optionally, in the follow-through position shown in FIG. 9, the tension members 16a and 16b may stretch slightly to provide a tension which serves to resist or arrest the progression of the follow-through such that the golfer G is encouraged to reach a desired follow-through position and does not "over-extend" the follow-through portion of the swing.

With continued repetition and use of the present device and method, the golfer G will develop a more fluid and balanced swing, and will eventually build a "muscle memory" of the correct mechanics of a proper golf swing, which the golfer G will be able to replicate with success on the golf course without the aid of the present device and method.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A golf swing training method for use by a golfer, said method comprising the steps of:
   standing in a ball address position with an end of a first tension member attached to a first shoulder region of the golfer and an opposite end of the first tension member attached to a first anchor point, the first tension member extending in a rearward direction from the golfer, and with an end of a second tension member attached a second, opposite shoulder region of the golfer and an opposite end of the second tension member attached to a second anchor point, the second tension member extending in a forward direction from the golfer;
   initiating a backswing to simultaneously increase a tension of the first and second tension members with substantially equal tensioning of the first and second tension members;
   transitioning the backswing to a downswing; and
   completing the swing with concurrent and substantially equal release of tension from the first and second tension members.

2. The method of claim 1, wherein in said standing step, at least one of the first and second tension members extends from the golfer substantially perpendicular to a shoulder line of the golfer.

3. The method of claim 1, wherein in said standing step, each of the first and second tension members extends from the golfer substantially perpendicular to a shoulder line of the golfer.

4. The method of claim 1 for a right-handed swing, wherein said standing step further comprises standing in the ball address position with the first tension member attached to the shoulder region of the golfer's left side and the second tension member attached to the shoulder region of the golfer's right side.

5. The method of claim 1 for a left-handed swing, wherein said standing step further comprises standing in the ball address position with the first tension member attached to the shoulder region of the golfer's right side and the second tension member attached to the shoulder region of the golfer's left side.

6. The method of claim 1, wherein said standing step further comprises standing in the ball address position with the first and second tension members under substantially no tension.

7. The method of claim 1, wherein said standing step further comprises standing in the ball address position with the first and second tension members under substantially equal tension.

8. The method of claim 1, wherein said transitioning step further comprises reaching a top of the backswing to place the first and second tension members under a maximum amount of tension for the swing.

9. The method of claim 1, further comprising the additional step of tensioning at least one of the first and second tension members during a follow-through after said completing step.

10. The method of claim 1, wherein in said standing step, each of the first and second tension members extends from the golfer at a downward angle.

11. A method for instructing a golfer to perform a golf swing, said method comprising the steps of:
    positioning a golfer in a ball address position with an end of a first tension member attached to a first shoulder region of the golfer and an opposite end of the first tension member attached to a first anchor point, the first tension member extending in a rearward direction from the golfer, and with an end of a second tension member attached to a second, opposite shoulder region of the golfer and an opposite end of the second tension member attached to a second anchor point, the second tension member extending in a forward direction from the golfer;
    instructing the golfer to execute a golf swing including the following steps:
        initiating a backswing to simultaneously increase a tension of the first and second tension members with substantially equal tensioning of the first and second tension members;
        transitioning the backswing to a downswing; and
        completing the swing with concurrent and substantially equal release of tension from the first and second tension members.

12. The method of claim 11, wherein in said positioning step, at least one of the first and second tension members extends from the golfer substantially perpendicular to a shoulder line of the golfer.

13. The method of claim 11, wherein said positioning step further comprises positioning the golfer in the ball address position with the first and second tension members under substantially equal tension.

14. The method of claim 11, wherein said completing step further comprises completing the downward swing with release of tension at a substantially equal rate from the first and second tension members.

15. The method of claim 11, wherein said transitioning step further comprises reaching a top of the backswing to place the first and second tension members under a maximum amount of tension for the swing.

16. The method of claim 11, wherein in said standing step, at least one of the first and second tension members extends from the golfer substantially perpendicular to a shoulder line of the golfer.

17. The method of claim 11, wherein in said standing step, each of the first and second tension members extends from the golfer substantially perpendicular to a shoulder line of the golfer.

18. The method of claim 11 for a right-handed swing, wherein said standing step further comprises standing in the ball address position with the first tension member attached to the shoulder region of the golfer's left side and the second tension member attached to the shoulder region of the golfer's right side.

19. The method of claim 11 for a left-handed swing, wherein said standing step further comprises standing in the ball address position with the first tension member attached to the shoulder region of the golfer's right side and the second tension member attached to the shoulder region of the golfer's left side.

20. The method of claim 11, wherein in said positioning step, each of the first and second tension members extends from the golfer at a downward angle.

* * * * *